United States Patent [19]
Houssian

[11] Patent Number: 5,835,980
[45] Date of Patent: Nov. 10, 1998

[54] RECEPTACLE PLATE

[75] Inventor: Vazgen Houssian, Union City, N.J.

[73] Assignee: American Tack & Hardware Co, Inc., Monsey, N.Y.

[21] Appl. No.: 914,005

[22] Filed: Aug. 6, 1997

[51] Int. Cl.[6] .................................................. H02G 3/14
[52] U.S. Cl. ............................................. 174/67; 220/3.8
[58] Field of Search .................................. 174/55, 66, 67, 174/58; 220/241, 242, 3.92, 3.94, 3.8; D13/156

[56] References Cited

U.S. PATENT DOCUMENTS

| | | | |
|---|---|---|---|
| D. 256,011 | 7/1980 | Matsuda | D13/38 |
| D. 311,371 | 10/1990 | Jacoby | D13/171 |
| D. 316,250 | 4/1991 | Mongeau | D13/170 |
| D. 324,816 | 3/1992 | LeDuc | D8/353 |
| D. 331,742 | 12/1992 | Fujiyoshi | D13/169 |
| D. 331,743 | 12/1992 | Fujiyoshi | D13/169 |
| D. 333,124 | 2/1993 | Carson | D13/169 |
| D. 336,744 | 6/1993 | Kahn et al. | D13/171 |
| D. 341,568 | 11/1993 | Sorenson et al. | D13/174 |
| D. 359,725 | 6/1995 | King, Sr. | D13/156 |
| D. 360,190 | 7/1995 | Fabich, Sr. | D13/156 |
| 2,892,172 | 6/1959 | McGann, Jr. | 439/135 |
| 2,943,138 | 6/1960 | Reager | 174/66 |
| 2,984,725 | 5/1961 | Hubbell et al. | 200/302.3 |
| 3,013,105 | 12/1961 | Craig | 174/67 |
| 4,166,934 | 9/1979 | Marrero | 200/51 R |
| 4,427,864 | 1/1984 | Oster | 200/330 |
| 4,488,024 | 12/1984 | Colgate | 200/330 |
| 4,631,354 | 12/1986 | Boteler | 174/66 |
| 4,757,168 | 7/1988 | Fujiyoshi et al. | 200/296 |
| 4,798,916 | 1/1989 | Engel et al. | 174/67 |
| 4,880,950 | 11/1989 | Carson et al. | 200/547 |
| 4,914,265 | 4/1990 | Mongeau | 200/330 |
| 4,972,045 | 11/1990 | Primeau | 174/66 |
| 5,180,886 | 1/1993 | Dierenbach et al. | 174/66 |
| 5,212,347 | 5/1993 | Powers et al. | 174/67 |
| 5,240,426 | 8/1993 | Barla | 439/136 |
| 5,321,206 | 6/1994 | Hibler | 174/66 |
| 5,527,993 | 6/1996 | Shotey et al. | 174/67 |
| 5,577,602 | 11/1996 | Conner et al. | 200/331 |

FOREIGN PATENT DOCUMENTS

| | | | |
|---|---|---|---|
| 968882 | 6/1975 | Canada | 174/66 |

*Primary Examiner*—Bot Ledynh
*Assistant Examiner*—Dhiru R. Patel
*Attorney, Agent, or Firm*—Hedman, Gibson & Costigan, P.C.

[57] ABSTRACT

A receptacle plate cover for a standard duplex electrical outlet which covers the entire outlet except for the outlet apertures that receive the prongs of an electrical plug.

16 Claims, 5 Drawing Sheets

RECEPTACLE PLATE

FIELD OF THE INVENTION

This invention relates a receptacle plate cover for a standard electrical outlet. The receptacle plate cover is an integral unit that can be used to replace traditional cover plates and which will provide the standard outlet with a simple modern facade. In a preferred embodiment, the present invention comprises a frame portion and a membrane portion wherein the frame portion is longitudinally convex. The arc shape of the longitudinally convex frame prevents an object from contacting both prongs of a conventional electrical plug while the prongs are engaged by the outlet.

BACKGROUND OF THE INVENTION

FIG. 1 depicts a standard duplex electrical outlet 1' and cover 2' which can be found in just about every home and office. As shown in FIG. 1, the standard duplex outlet comprises two elongated oval structures with apertures for engaging the prongs of a conventional electrical plug.

FIG. 2 depicts a recent modification to the standard duplex outlet wherein the outlet portion 1" is a rectangular structure that can accommodate two electrical plugs and a cover 2". The outlet and cover depicted in FIG. 2 is a simple design, however, an electrician is required to convert the standard outlet of FIG. 1 to the modern outlet shown in FIG. 2 because the electrical wiring of the standard duplex outlet must be disconnected and then reconnected to the modern rectangular outlet.

U.S. Pat. Nos. 4,972,045 and 5,180,886 attempt eliminate the need for a electrician to convert the standard duplex outlet to a modern rectangular outlet by providing a multi piece cover plate assembly which covers the standard outlet. These devices have not proven successful because of the multiple pieces required.

Not only is changing from the standard outlet to the modern outlet and visa versa a complicated task, both types of outlet designs have common disadvantages such as the unsightly apertures for the prongs of an electrical plug and a flat appearance which enables objects such as a knife or picture frame wire to skim along the surface of the outlet and contact both prongs of an electrical plug while they are engaged in the outlet. This contact can causes sparking and/or shorting of the circuit that can result in injury to a person or property.

SUMMARY OF THE INVENTION

It is an objective of the present invention to provide a integral cover plate for a standard duplex outlet that can be simply attached to a standard duplex outlet without the need for electrical connections or assembly and provides the standard duplex outlet with the appearance of a modern rectangular outlet.

It is a further objective of the present invention to provide an outlet cover than can reduce the likelihood of an object or individual from connecting both prongs of an electrical plug while they are engaged by the outlet.

It is a further objective of the present invention to provide a cover plate assembly wherein the unsightly apertures that receive the prongs of an electrical plug are less obtrusive.

The foregoing objectives are met by an integral plate cover comprising a membrane portion and a frame portion. Apertures are formed in the membrane portion that correspond to the apertures of a standard electrical outlet. The apertures in the membrane portion allow the prongs of an electrical plug to engage the electrical apertures of the standard outlet. The membrane portion covers or masks the standard outlet and particularly the two elongated oval structures of the outlet and provides the standard outlet with the appearance of a modern rectangular outlet. The membrane portion may also be large enough to cover or mask an electrical box in which the standard outlet is housed and/or a portion of the wall or floor surrounding the electrical box. The membrane portion further comprises a rear surface, a front surface and a means for attaching the cover to the outlet.

The frame portion provides support for the membrane portion and can be flat, laterally convex or longitudinally convex. The longitudinally convex shape optimizes the capacity of the present invention to reduce the likelihood of an object connecting both prongs of an electrical plug while they are engaged by the outlet.

The frame portion and the membrane portion are integrally formed as a single unit by any of the techniques commonly known in the industry such as injection molding the frame portion and membrane portion as a single unit, ultrasonic welding of the membrane portion to the frame portion, or adhering the membrane portion to the frame portion.

The present invention can be made from any type of material commonly used in the industry to manufacture outlet covers. It is preferred that the present invention be made from a plastic material such as polycarbonate, polyethylene, polypropylene, nylon or polystyrene.

In a preferred embodiment the membrane portion is made of a resilient rubber material or is covered with a resilient rubber film with slits that correspond to the electrical apertures in the outlet which engage the prongs of an electrical plug. The slits in the rubber membrane or film reduce the size of the unsightly outlet apertures and also prevents foreign material such as dust and paint from entering the outlet apertures.

DETAILED DESCRIPTION OF THE INVENTION

The present invention will be described in detail by reference to the drawings. The drawings are for illustration and are not intended to limit the scope of the invention.

Figure 1:
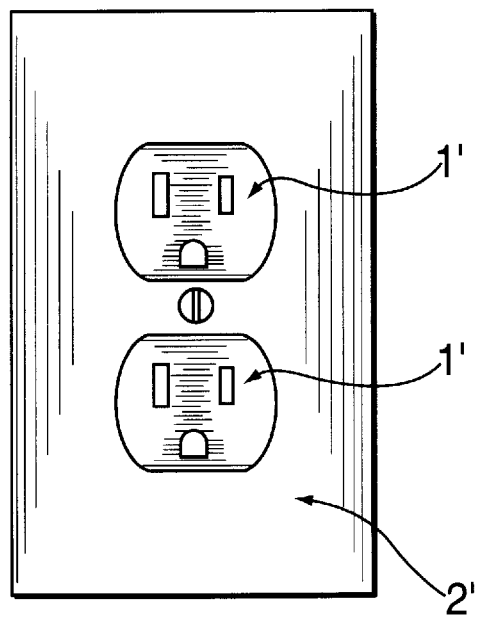
FIG. 1 is a front view of a standard electrical outlet and cover.
Figure 2:
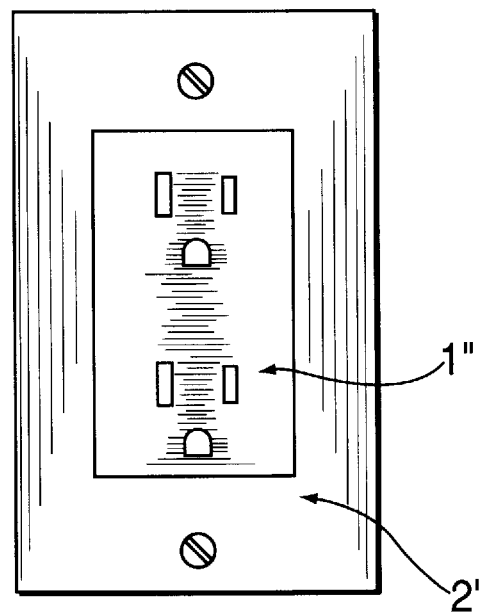
FIG. 2 is a front view of the modern rectangular outlet and cover.
Figure 3:
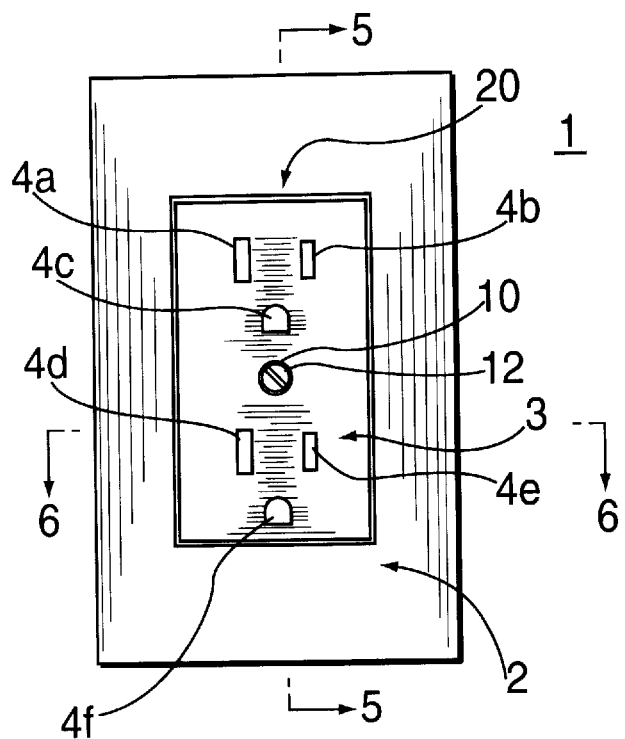
FIG. 3 is a front view of a preferred embodiment of the present invention.

Referring to FIGS. 3, the present invention is a cover 1 for a standard electrical duplex outlet comprising a frame portion 2 and a membrane portion 3. The frame portion 2 surrounds and supports the membrane portion 3. It is preferred that the frame portion 2 and membrane portion 3 be formed as a single unit by injection molding of a plastic material such as polycarbonate. Forming the frame portion 2 and membrane portion 3 as a single unit allows the cover 1 to be easily installed on a standard duplex outlet.

In a preferred embodiment, the frame portion 2 has outside dimensions of a standard cover plate or slightly larger than a standard cover plate to mask the paint or dirt line created by the old outlet cover. The membrane portion 3 has a longitudinal dimension of approximately 3.000 inches, a lateral dimension of approximately 1.578 inches and a thickness of approximately 0.010 to 0.125 inches, preferably 0.01 to 0.1 inches and most preferably approximately 0.05 inches. The longitudinal and lateral dimensions of the frame portion 2 and membrane portion 3 are not critical as long as the membrane portion 3 covers the two elongated oval structures of the outlet and the frame portion 2 supports the membrane portion 3.

As shown in FIG. 3, the cover 1 is formed with an aperture 10. Aperture 10 is sized to receive a screw 12 which passes through the membrane portion 3 of the cover 1 and attaches the cover 1 to the standard duplex electrical outlet. It is preferred that the screw 12 be recessed into the membrane portion 3 of the cover 1 to provide a smooth appearance to the cover 1 when it is attached to the standard duplex outlet. Apertures 4a–4f are also formed in the membrane portion 3 of the cover 1. Apertures 4a–4f are sized and located to correspond to the apertures of the standard duplex electrical outlet which receive the prongs of an electrical plug.

Figure 4:
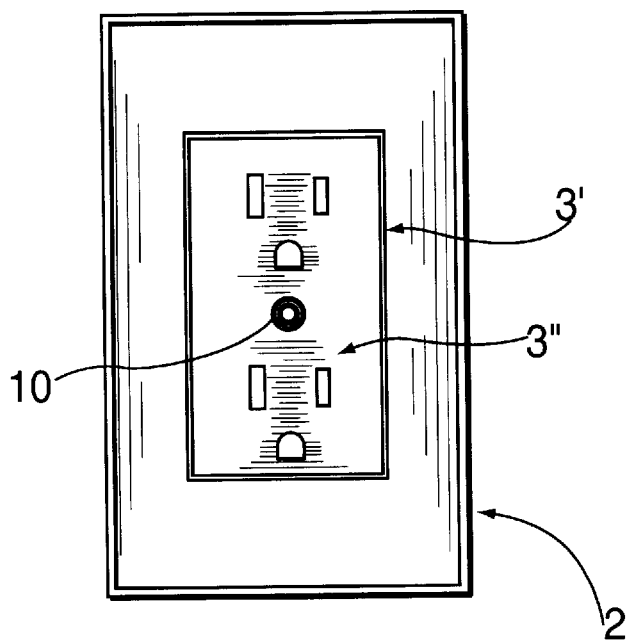
FIG. 4 is a rear view of a preferred embodiment of the present invention as shown in FIG. 3.
Figure 6:
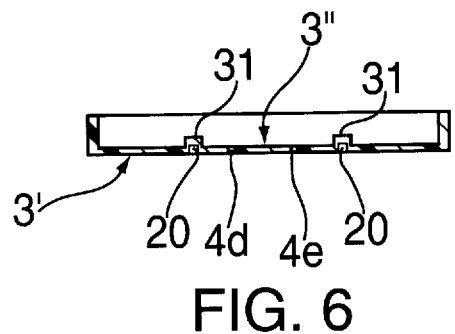
FIG. 6 is a side sectional view of a preferred embodiment of the present invention taken along lines 6—6 of FIG. 3.
Figure 5:
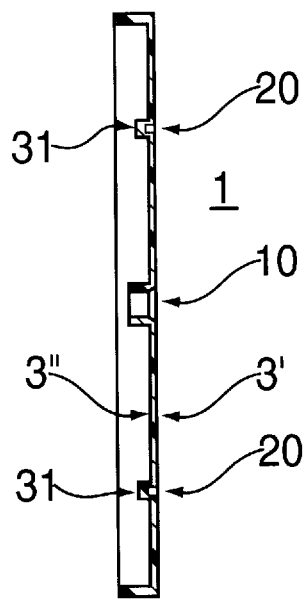
FIG. 5 is a side sectional view of a preferred embodiment of the present invention taken along lines 5—5 of FIG. 3.
Figure 7:
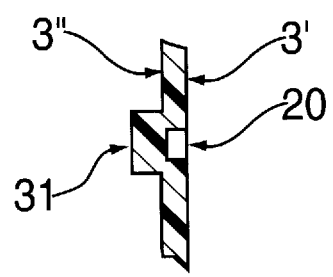
FIG. 7 is an expanded side sectional view of the locating projection and groove of a preferred embodiment of the present invention as shown in FIG. 5.
Figure 8:
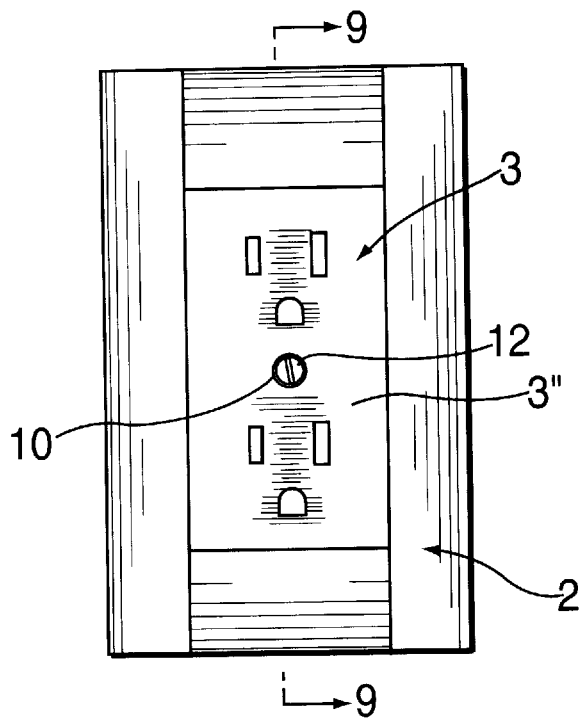
FIG. 8 is a front view of a preferred embodiment of the present invention wherein the frame portion is longitudinally convex.
Figure 9:
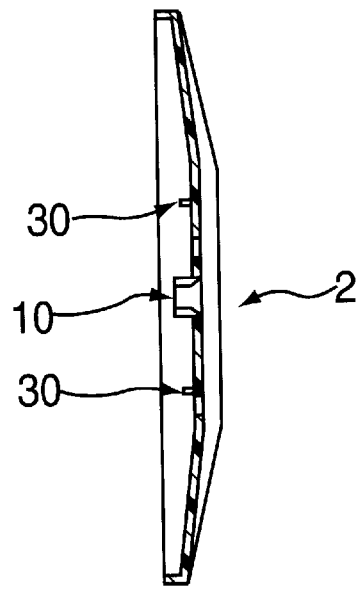
FIG. 9 is a side sectional view of a preferred embodiment of the present invention taken along lines 9—9 of FIG. 8.
Figure 10:
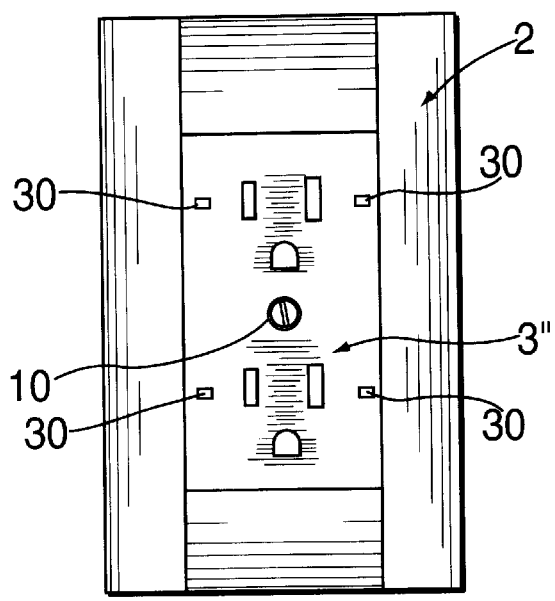
FIG. 10 is a rear view of a preferred embodiment of the present invention shown in FIG. 9.
Figure 11:
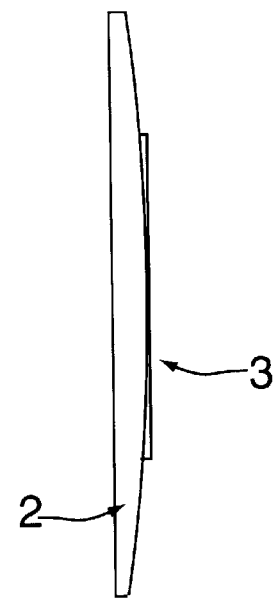
FIG. 11 is a side view a preferred embodiment of the present invention wherein the frame portion is longitudinally convex.

The rear surface 3" of the membrane portion 3 comprises a means for locating the cover 1 on the standard duplex electrical outlet. As shown in FIG. 4, the locating means comprise rib 31 that depends downwardly from the rear surface 3" of the membrane portion 3. The locating rib 31 is preferably rectangular in shape with inner dimensions that contact the outer edges of the elongated oval structures of a standard outlet. As shown in FIG. 10, in another preferred embodiment, the locating means comprise projections 30 which extend downwardly from the rear surface 3" of the membrane portion 3. The projections 30 can be any shape or dimension, however it is preferred that the projections 30 have a longitudinal dimension of approximately 0.030 inches, a lateral dimension of approximately 0.10 inches and depend downwardly approximately 0.060 inches. The projections 30 are preferably position so that the longitudinally edges of the projections contact the peaks of the arc of the two elongated oval structures that comprise the standard outlet.

The locating means assist in properly locating the cover 1 on the standard outlet so that apertures 4a–4f are properly aligned with the apertures of the outlet which receive the prongs of an electrical plug and the aperture 10 is properly aligned with the screw receiving aperture on the outlet. The locating means also serve to prevent the cover 1 from being moved or rotated out of alignment with the outlet once the cover 1 is installed on the outlet.

If the cover 1 is formed by injection molding, the presence of locating means on the rear surface 3" of the membrane portion 3 will have a tendency to produce a depression or indentation of the front surface 3. This indentation is undesirable because it detracts from the aesthetic appearance of the cover. To avoid the indentation problem a small groove 20 is formed on the front surface 3' of the membrane portion 3. It is preferred that the groove 20 be approximately 0.030 inches deep and approximately 0.040 inches wide. The size and shape of the groove 20 can be varied depending upon the aesthetic appearance desired, however, the dimensions should be such that the indentations caused by the locating means are eliminated.

Figure 12:
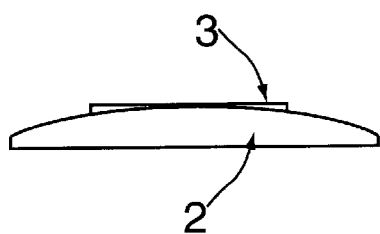
FIG. 12 is a top view of a preferred embodiment of the present invention wherein the frame portion is laterally convex.
Figure 13:
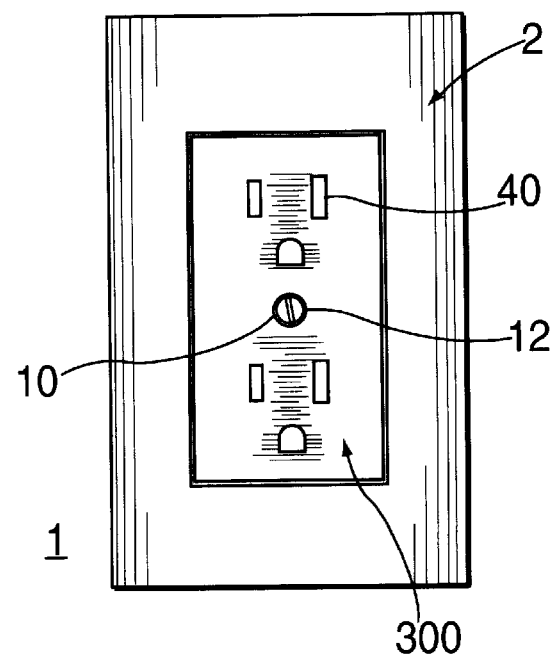
FIG. 13 is a front view of an alternative preferred embodiment of the present invention.

The cover 1 as shown in FIG. 3 comprises a flat frame portion 2 and a flat membrane portion 3 wherein the frame and membrane portions are approximately the same height. In alternative embodiments of the present invention the frame portion 2 and the membrane portion 3 can be different heights. For example the membrane portion may be higher than the frame portion and vise versa. In a particularly preferred embodiment the frame portion 2 is a convex shape. As shown in FIGS. 8–11 the frame portion 2 can be longitudinally convex or as shown in FIG. 12 the frame portion 2 can be laterally convex.

The radius of the longitudinally convex frame portion 2 can range from about 5 to 25 inches, preferably 8 to 15 inches. The radius of the laterally convex frame 2 can range from 2–10 inches, preferably 4 to 7 inches. In the most preferred embodiment the radius of the longitudinally convex frame portion 2 is 9.5 inches and the radius of the laterally convex frame portion 2 is approximately 5.5 inches.

By varying the height of the frame portion 2 with respect to the membrane portion 3, the safety of the outlet cover 1 can be improved. For example, a cover in accordance with the present invention is prepared by forming the frame portion with a longitudinal convex shape wherein the radius of the convex arc is approximately 9.5 inches. This longitudinally convex frame will deflect an object such as a knife or picture frame wire away from the prongs of an electrical plug that is engaged in the outlet. A longitudinally convex frame which provides the added protection against finger contact with the prongs of an electrical plug need not be integrally formed with the cover to be within the intended scope of the present invention.

By making the height of the frame portion 2 higher than the membrane portion 3 reduces the likelihood of an individual receiving an electrical shock when inserting or removing a conventional plug from an outlet. More specifically, by making the frame portion 2 at least 0.250 inches and preferably 0.375 inches higher than the membrane portion 3, an individual will be unable to insert his fingers between the frame portion 2 and the prongs of an electrical plug while the prongs are engaged in the outlet. For the best protection, both the longitudinal and lateral sections of the frame portion 2 should be higher than the membrane portion, however, a convex shaped frame portion 2 can also be used provided the radius of the arc is sufficient to prevent the insertion of a finger in the area between the frame portion 2 and the prongs of an electrical plug when the prongs are engaged the electrical outlet.

In an alternative embodiment of the present invention, the membrane portion 3 of the cover 1 comprises a thin film of a rubber material 300. As shown in FIG. 12, the rubber film 300 is formed with slits 40 that correspond to the electrical apertures of the outlet. The slits 40 allow the prongs of an electrical plug to enter the apertures of the standard outlet. The slits 40 mask the electrical apertures of the outlet and improve the aesthetic value to the present invention. The slits 40 also provide the present invention with the additional benefit of preventing foreign material such as dust or paint from entering the electrical apertures of the outlet. In a preferred embodiment of the present invention, the thickness of the rubber film can range from 0.010 to 0.030 inches, preferably 0.015 to 0.025 inches and most preferably about 0.020 inches.

In an alternative embodiment of the present invention, the membrane portion 3 may be formed of a rubber material with slits 40 and thereby eliminate the need for the rubber film 300. In this embodiment the thickness of the rubber membrane portion 3 can range from 0.030 to 0.125 inches, preferably 0.040 to 0.080 inches and most preferably about 0.050 inches.

Many variations of the present invention will suggest themselves to those skilled in this art in light of the above, detailed description. For example, the sizes of the frame and membrane portions may be varied. In addition, the shape of the cover can be varied from a rectangular shape to an oval, circle or other ornamental shape. In addition the invention can be used on double or multiple wall outlet arrangement. All such obvious modifications are within the full intended scope of the appended claims.

All the above mentioned patents, publications and test methods are herein incorporated by reference.

I claim:

1. A receptacle plate cover for a duplex electrical outlet consisting essentially of:
   (a) a frame portion;
   (b) a membrane portion with apertures that correspond to a electrical plug prongs and allow the prongs to engage the outlet comprising a front surface, a rear suface and a means for attaching the cover to the outlet;
   (c) a locating means for locating the cover on the outlet wherein said locating means is on the rear surface of the membrane portion; and
   (d) a groove formed on the front surface of the membrane portion that corresponds to the locating means wherein said locating means, groove and membrane portion are an integral unit and the membrane portion masks the outlet.

2. A cover as defined in claim 1 wherein the locating means are a plurality of projections that extend downwardly from the rear surface of the membrane portion.

3. A cover as defined in claim 1 wherein the cover is formed by injection molding the frame portion and membrane portion as one unit.

4. A cover as defined in claim 1 wherein the membrane portion is covered with a rubber film with slits corresponding to the apertures of the membrane portion.

5. A cover as defined in claim 1 wherein the membrane portion further comprises a rubber film.

6. A cover as defined in claim 1 wherein the frame portion is a convex arc shape.

7. A cover as defined in claim 6 wherein the frame portion is laterally convex arc shape.

8. A cover as defined in claim 1 wherein the means for attaching the cover to the outlet comprises a screw which passes through an aperture in the membrane portion of the cover to a receptacle in the outlet.

9. A cover as defined in claim 6 wherein the frame portion is longitudinally convex arc shape.

10. A longitudinally convex receptacle plate cover for a standard duplex electrical outlet comprising:
    (a) a longitudinally convex arc shape frame portion, and
    (a) a flat membrane portion with apertures that correspond to an electrical plug prongs and allow the prongs to engage the outlet comprising a front surface, a rear surface and a means for attaching the cover to the outlet wherein the means is on the rear surface of the membrane portion, wherein the longitudinally convex arc shape frame portion extends above the membrane portion to prevent an individuals fingers from contacting the prongs of an electrical plug when the prongs are engaged by the outlet.

11. A cover as defined in claim 10 wherein the locating means are a plurality of projections that extend downwardly from the rear surface of the membrane portion.

12. A cover as defined in claim 11 wherein a groove is formed on the front surface of the membrane portion that corresponds to one of said plurality of projection 5.

13. A cover as defined in claim 10 wherein the membrane portion is attached to the arc shape frame by ultrasonic welding or adhesive.

14. A cover as defined in claim 10 wherein the cover is formed by injection molding the frame portion and membrane portion as one unit.

15. A cover as defined in claim 10 wherein the membrane portion is covered with a rubber film with slits corresponding to the apertures of the membrane portions.

16. A cover as defined in claim 10 wherein the frame portion and membrane portion are an integral unit.

* * * * *